United States Patent [19]

Bark et al.

[11] 3,946,719
[45] Mar. 30, 1976

[54] RADIANT GAS HEATER

[76] Inventors: Semen Efimovich Bark, Profsojuznaya ulitsa, 32/10, kv. 142; Ivan Semenovich Garkusha, B. Serpukhovskaya ulitsa, 31, korpus 5, kv. 166-b; Jury Pavlovich Kafyrin, Klenovy bulvar, 22, kv. 29; Efim Vulfovich Kreinin, Starye Kuzminki, kvartal 127a, 9-b, kv. 69; Nikolai Ananievich Fedorov, B.Serpukhovskaya ulitsa, 31, korpus 5, kv. 198-b, all of Moscow; Vladimir Fedorovich Shulyak, ulitsa Sovetskaya, 24, kv. 43, Balashikha Moskovskoi oblasti; Alexandr Alexandrovich Khaitin, Sumskoi proezd, 5, korpus 1, kv. 205, Moscow; Sergei Gavrilovich Alexandrov, ulitsa K.Marxa, 52, kv. 20; Marat Mikhailovich Bobrov, ulitsa Volodarskogo, 84, kv. 46, both of Kamensk-Shakhtinsky Rostovskoi oblasti; Vyacheslav Grigorievich Goman, prospekt Lenina, 6, kv. 18, Kuibyshev; Viktor Sergeevich Ermolaev, Rublevskoe shosse, 83, korpus 2, kv. 13; Sergei Vladimirovich Leonov, Yartsevskaya ulitsa, 34, korpus 2, kv. 36, both of Moscow; Vikenty Pavlovich Mikheev, ulitsa Nevskaya, 5, kv. 15, Kuibyshev, all of U.S.S.R.

[22] Filed: July 31, 1974

[21] Appl. No.: 493,729

[52] U.S. Cl............ 126/91 A; 126/92 AC; 431/353
[51] Int. Cl.² ...................................... F24C 3/00
[58] Field of Search .......... 126/92 R, 92 A, 92 AC, 126/92 C, 360 R, 360 A, 91, 91 A; 431/157, 158, 353

[56] References Cited
UNITED STATES PATENTS

| | | | |
|---|---|---|---|
| 2,253,920 | 8/1941 | Vaughan | 126/91 A |
| 2,255,540 | 9/1941 | Dieffein | 126/91 A |
| 3,174,474 | 3/1965 | Jones et al. | 126/91 A |
| 3,688,760 | 9/1972 | Rudin | 126/91 A |

FOREIGN PATENTS OR APPLICATIONS

| | | | |
|---|---|---|---|
| 208,905 | 10/1959 | Austria | 126/91 A |

*Primary Examiner*—John J. Camby
*Assistant Examiner*—Henry C. Yuen
*Attorney, Agent, or Firm*—Holman & Stern

[57] ABSTRACT

A heater includes coaxially arranged an external heat radiating shell, a central gas fuel tube and an intermediate perforated air conducting tube, from inside of which air flows into a combustion chamber.

A tubular partition is provided with the space in between the air conducting tube and the central gas fuel tube, whereby the initial air flow blowing around and lengthwise of the gas fuel tube is to be turned near the end of this tube to pass to the perforated walls of the air conducting tube.

4 Claims, 1 Drawing Figure

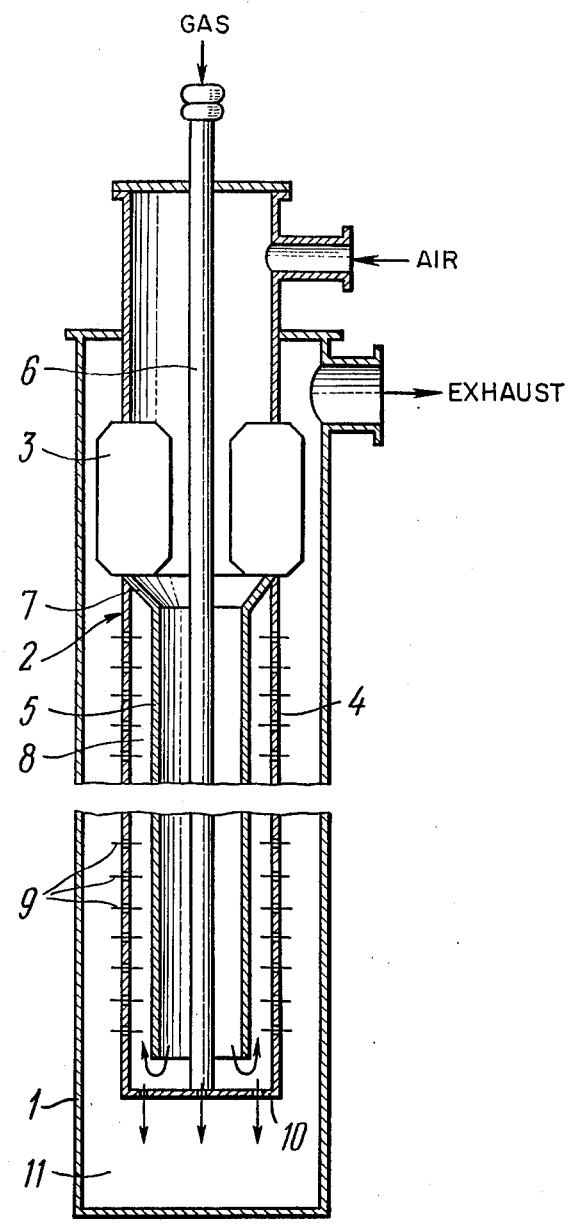

RADIANT GAS HEATER

The present invention relates to radiant gas heaters for ovens for chemical and heat treatment of metals in a controllable atmosphere, and more particularly, to radiant tube gas heaters closed at one end.

Known in the art is a closed-end radiant tube heater comprising a central fuel tube, an intermediate perforated air tube and an external radiant tube, located coaxially, and a gas burner arranged at the closed end of the external radiant tube.

These known designs of the closed-end radiant tube gas heater features a number of significant disadvantages. For instance, the construction of the gas burner unit made in the form of pre-mix cone at the end of the fuel and gas tubes does not permit the gap therebetween to be substantially reduced.

Release of a portion of the air through the end face of the air tube is not provided and this reduces the efficiency of cooling of the air tube along the whole length thereof and especially in its end portion.

In addition, the gas burner is provided only with axial holes for feeding the fuel and this practically results in an intensive deposition of soot on the air tube walls.

Perforations uniformly drilled along the length of the air tube do not provide for uniform heating of the external radiant tube, the maximum-to-minimum temperature ratio being equal to 1.2–1.3 which is inadmissible when using the radiant tubes in heating ovens.

Recuperation of the heat of the exhaust gases is not provided and as a result the efficiency of the known radiant tubes cannot be raised higher than 45–50% at a surface temperature of 1000°C unless a specific recuperator is used.

To eliminate the above-mentioned disadvantages a closed-end radiant gas tube has been provided (inventor's certificate N 251743 issued June 30, 1969 in the USSR), said tube comprising coaxially arranged elements—an external heat radiating shell and an air conducting tube the walls whereof form a combustion chamber, a central gas tube supplying gas fuel into the combustion chamber, wherein said air conducting tube is provided at its one, internally disposed end with a perforated bottom portion somewhat spaced apart from the bottom portion of the heat radiating shell, a plurality of perforations provided substantially over the length of the side wall portion of the air conducting tube to let the air flow being pumped to the other, externally disposed end of the tube pass into the combustion chamber, and a recuperator arranged adjacently to said perforated side wall portion in the zone of exhaust gas discharge from the combustion chamber.

Another serious disadvantage of the device specified consists in undesirable overheating of the central gas tube and the gas contained therein near the closed end portion of the external radiating shell up to the temperature close to that of the radiant surface.

This results in the temperature dissociation of a natural gas being used and the central gas tube is obstructed rapidly with free carbon.

The main object of the present invention is to provide such a radiant gas heater the design of which will improve resistance to the temperature loads in the course of the use and accordingly longer service life of the device without running repair.

Another object of the invention is to provide a radiant gas heater, wherein resistance and longer service life are obtained due to relatively simple and technological constructive means.

Still another object of the present invention is to provide such a radiant gas heater, wherein temperature being maintained in the combustion chamber would be substantially reduced and internal elements would not be subjected to destructive overheating during operation.

To meet these and other objects a radiant gas heater, in accordance with the present invention, comprising coaxially arranged elements— an external heat radiating shell and an air conducting tube the walls whereof form a combustion chamber, a central gas tube supplying gas fuel into the combustion chamber, wherein said air conducting tube is provided at its one, internally disposed end with a perforated bottom portion spaced somewhat apart from the bottom portion of the heat radiating shell, a plurality of perforations provided substantially over the length of the side wall portion of the air conducting tube to let the air flow being pumped to the other, externally disposed end of the tube pass into the combustion chamber, and a recuperator arranged adjacently to said perforated side wall portion in the zone of exhaust gas discharge from the combustion chamber said gas heater is characterized in that an air conducting tube is provided with a passage means inside thereof for directing the air being delivered from the externally disposed end, to flow first along the central gas tube to the very bottom of said air conducting tube and then in the opposite direction along said perforated side wall portion of the air conducting tube. The above-mentioned improvement makes the cooling of the central gas fuel tube by the initial air flow being pumped into the heater more efficient.

In accordance with one of the modifications of the present invention, a radiant gas heater is characterized in that a tubular intermediate partition is disposed in the inner space of the air conducting tube coaxially therewith between the perforated walls of said tube and the central gas fuel tube, said tubular partition having one of its ends open and somewhat spaced from the bottom of the air conducting tube to permit the air flow to pass from the inner space of the tubular partition to the perforated walls. The other end of said partition is open to pump therein an initial air flow passing into the inner space of the tubular partition and is tightly attached to the air conducting tube to divide the space within said tube into two separate annular passages.

Such embodiment of the invention as proposed above allows by relatively simple structural means to effect in accordance with the invention proper turning over of the initial air flow by 180° near the bottom of the air conducting tube.

To avoid drawing of the exhaust gas into the air collector the distance from the inner end of the tubular partition to the first perforations in the wall of the air conducting tube is obtained by the following expression:

$$l > \sqrt{d_1^2 + d_2^2} - 1.5\, d_2,$$

where $l$ — is the distance from the first perforations to the lower end of the tubular partition;
$d_1$ the internal diameter of the air conducting tube;
$d_2$ the external diameter of the tubular partition.

The foregoing structural embodiment of the invention prevents undesirable drawing of the exhaust gases from the combustion chamber into the space within the air conducting tube and, thus excludes overheating of the tubular partition and the central gas fuel tube.

In accordance with the present invention a radiant gas heater, is also characterized in that the central gas fuel tube made with a diameter not exceeding 0.03 $\sqrt{d_H}$, where $d_H$ is the outer diameter of the external heat radiating shell.

The above structural embodiment of the invention is provided for preventing the termal dissociation of the gas fuel to free carbon state (soot).

There is another modification of the invention according to which the distance between the adjacent walls of the external heat radiation shell and the air conducting tube is not more than 7 times as long as the diameter of the perforations made in the perforated wall portion of the air conducting tube.

This embodiment of the invention makes it possible to intensify heat exchanging process within the combustion chamber and, as a result of this, to reduce the temperature in the chamber and the possibility of overheating of the internal elements as well.

Other objects and advantages of the invention will be more apparent from the following detailed description of an exemplary embodiment of the present invention which is given with reference to the accompanying drawing, wherein a sectional view of the radiant gas heater according to the invention is illustrated.

Referring now to the drawing, the radiant gas heater includes coaxially arranged elements an external heat radiating shell 1, an air conducting tube 2 provided with a recuperator 3 and a perforated wall portion 4, an intermediate tubular partition 5 and a central gas fuel tube 6.

At the point where the air conducting tube 2 is divided with the recuperator 3 and the perforated portion 4 a ring 7 is mounted closing a circular passage 8 formed inbetween the tubular partition 5 and the perforated wall portion 4 of the intermediate air conducting tube 2.

Air apertures 9 are drilled in a certain order throughout the length of the perforated wall portion 4 of the air conducting tube 2. The lower end of the perforated portion 4 of the air conducting tube 2 is provided with a bottom 10 having perforations therethrough.

In the space between the external heat radiating shell 1 and the air conducting tube 2 a combustion chamber 11 is formed.

The radiant gas heater according to the invention operates in the following way.

Being pumped into the radiant gas heater an initial air flow passes the recuperator 3 of the air conducting tube 2 and its temperature increases up to 400°–700°C (it depends on the efficiency of the gas heater), after that the air flow goes into the circular passage 8 formed inbetween the central gas fuel tube 6 and the tubular partition 5. A portion of the air flow escapes through the apertures of the perforated bottom 10, while the rest being turned for 180° enters the circular passage 8 in the space between the tubular partition 5 and the perforated portion 4 of the air conducting tube 2. In the circular passage 8 the air discharges through the apertures 9.

A flow of exhaust gases moving from the closed end of the external heat radiating shell 1 to the output is penetrated by numerous air currents ensuring thereby the intensive mixing and burning process.

The central gas fuel tube 6 is efficiently cooled owing to the fact that the total air flow first washed this tube and only after that the air flow gets to be distributed over the apertures 9 of the perforated wall portion 4 of the air conducting tube 2.

Besides, the tubular partition 5 reduces nearly by half the radiant flow from the air conducting tube 2 onto the central gas fuel tube 6.

According to the experimental data (c.f. I. L. Povkh "Airodinamichesky experiment v mashinostroenyi" [Airdynamic experiment in machine building industry], M-L, 1965), the loss of the pressure in the course of turn of the air flow for 180° (c.f. FIG. 1) is equal to 4 velocity pressures that corresponds to the contraction of the cross section of the flow in two times. This contraction of the air flow takes place due to formation of the break down zone near the intermediate tubular partition 5 immediately after the turning point. The area of the cross section of the break down zone is equal to a half of the total cross section of the circular passage 8;
where:
$f_{z/f} = 0.5$
$f_z$ is the area of the cross section of the break down zone;
$f$ the area of the cross section or the circular passage 8.

If we designate the height of the break down zone as $h_z$, we shall obtain $$\frac{f_z}{f} = \frac{(d_2 + 2h_3)^2 - d_2}{d_1 - d_2^2} = 0.5,$$

where
$d_1$ is the internal diameter of the air conducting tube;
$d_2$ is the external diameter of the tubular partition.
Hence $2h_z = 0.7 \sqrt{d_1^2 + d_2^2} - d_2$.

Investigation of the break down zones (G. N. Abramovitch "Teoria turbulentnikh strui" [Theory of turbulent currents], Physmatgiz, 1960) has proved that the longitudinal size [$l_z$] of the break down zone is approximately six times as much as the transversal one [$h_z$]. Consequently, $l_z \cong 6h_z \sqrt{d_1^2 + d_2^2} - 3d_2$.

In accordance with our experimental data obtained for the circular passage of the gas radiant tube with the diameter of its external heat radiating shell equal to 180 mm ($d_1 = 92$ mm, $d_2 = 63$ mm) the negative static pressure within the circular passage was observed at a distance up to 25 mm from the end of the tubular partition. Consequently, the presence of the apertures 8 within this zone of the perforated portion 4 will lead to the penetration of the hot components of the fuel into the circular passage 8. Burning of these components will result in the overheating (burning off) of the tubular partition 4 and the central gas fuel tube.

The calculation of the length ($l_z$) of the break down zone in accordance with the above-mentioned formula gives the value 46 mm; the zone (1) of the negative pressure is a half of the total break down zone:

$$l = 0.5 \, l_z \approx \sqrt{d_1^2 + d_2^2} - 1.5 \, d_2.$$

Absence of the apertures within this zone prevents drawing of the fuel components into the circular passage.

The choice of the optimum diameter of the central gas fuel tube 5 is made proceeding from the following considerations.

The rate of the gas flow into the radiant gas heater is defined on the one part by the conditions of the external heat exchange $$B_g = \frac{q.l.d_H.\pi}{\eta.Q_H^p};$$

and, on the other part by the conditions of gas flowing within the central gas fuel tube $$B_g = \frac{0.785.l.d^2.3600}{\tau};$$

wherein $B_g$ is the rate of the gas flow, m³hour;

$q$ the heat output of the radiant heater kkal/m²h;

$l$ the length of the effective portion of the gas radiant heater, m, $d_H$ the outer diameter of the external heat radiating shell, m $d$ the inner diameter of the central gas fuel tube, m;

$Q_H^p$ the heat release ability of the gas fuel, kkal/m³, $\tau$ — time of presence of the gas fuel in the central gas fuel tube, sec;

$\eta$ — the efficiency of the radiant heater (~0.7).

Roughly, the minimum heat output of the radiant heaters is believed equal to 8000 kkal/m²h.

Special experimental investigations showed that every temperature value of the wall of the central gas fuel tube corresponds to a definite minimum time of presence of the fuel within the tube; during this time the reactions of temperature, dissociation of the fuel do not lead to liberation of free carbon (soot in the volume). So, e.g. with the temperature of the wall being equal to 850°C the minimum allowable time of presence of the natural gas within the central gas fuel tube is 0.5 sec.

Thus, the optimum inner diameter of the central gas fuel tube is determined by the ratio:

$$\frac{q.l.d_H.\pi}{\eta.Q_H^p} = \frac{0.785.l.d^2.3600}{\tau}$$

or $$\frac{8000.d_H.3,14}{0,7.8400} = \frac{0,785.d^2.3600}{0,5}$$

and whereby $d = 0.0275 \sqrt{d_H}$.

Thus, to prevent liberation of the free carbon (soot) within the central gas fuel tube the inner diameter thereof is specified proceeding from unequality $d = 0.03 \sqrt{d_H}$.

The width of the combustion chamber confined by the external heat radiating shell 1 and the perforated portion 4 affects the heat exchange greately.

Experiments show that with the width of the combustion chamber up to 7 diameters of the air apertures the perforated wall portion 4 is not overheated. With increasing the width of the combustion chamber heat output from flares is diminished and thereby the temperature of the air conducting tube increases and, hence, the temperature of the central gas fuel tube 5 increases too.

Taking into account the foregoing conditions, the gas radiant heater is reliable in use for the temperature processes with temperature of the space of the furnace up to 950°C.

What we claim is:

1. A radiant gas heater comprising coaxially arranged elements — an external heating heat-radiating shell having a bottom at one end thereof; an air-conducting tube inside said shell, the inner end of said air-conducting tube extending into said radiating shell, and being provided with a bottom somewhat spaced from the bottom of said external heat radiating shell and another top end, protruding outwardly from said external heat-radiating shell, which is open for supplying an air flow through said air-conducting tube, a combustion chamber formed inbetween said external heat-radiating shell and said air-conducting tube, said air-conducting tube having perforations in the side walls and the bottom thereof to let air pass into said combustion chamber; a central gas tube disposed within said air-conducting tube for supplying gas fuel into said combustion chamber; an intermediate tubular partition disposed in the air-conducting tube coaxially therewith between the perforated sidewall portion of said air-conducting tube and the central gas tube, said tubular partition having one end open and spaced somewhat apart from the bottom portion of said air-conducting tube to permit the air flow from the inner space of the tubular partition to said perforated side wall portion, the other end of said tubular partition being open to deliver therein the initial air flow into the inner space of said tubular partition and being tightly attached to said air-conducting tube to divide the space within said tube into two separate annular passages for the flow of air and a recuperator disposed at the portion of said air-conducting tube in the zone of output of exhaust gases from said combustion chamber.

2. A radiant gas heater as claimed in claim 1, wherein the distance from the lower end of the tubular partition to the first perforations in the wall of said air conducting tube is obtained by the following expression:

$$l > \sqrt{d_1^2 + d_2^2} - 1.5\, d_2,$$

wherein $l$ is the distance from the first perforations to said lower end of the tubular partition, $d_1$ the internal diameter of the tubular partition, $d_2$ the external diameter of the tubular partition.

3. A radiant gas heater as claimed in claim 2, wherein the diameter of the central gas tube does not exceed $0.03 \sqrt{d_o}$, where: $d_o$ is the outer diameter of the external heat radiating shell.

4. A radiant gas heater as claimed in claim 2, wherein the distance between the adjacent walls of said external heat radiating shell and the air conducting tube is not greater than 7 times as long as the diameter of the perforations made in the perforated side wall portion of the air conducting tube.

* * * * *